United States Patent
Geissler et al.

(10) Patent No.: US 8,029,623 B2
(45) Date of Patent: *Oct. 4, 2011

(54) ACID REMOVAL IN CLEANING PROCESSES

(75) Inventors: Konrad Geissler, Zürich (CH); Marius Kuemin, Huenenberg (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/737,381

(22) PCT Filed: Jun. 30, 2009

(86) PCT No.: PCT/US2009/003884
§ 371 (c)(1),
(2), (4) Date: Jan. 7, 2011

(87) PCT Pub. No.: WO2010/005518
PCT Pub. Date: Jan. 14, 2010

(65) Prior Publication Data
US 2011/0100398 A1  May 5, 2011

Related U.S. Application Data

(60) Provisional application No. 61/134,246, filed on Jul. 8, 2008.

(51) Int. Cl.
*B08B 7/04* (2006.01)

(52) U.S. Cl. ..... 134/10; 134/2; 134/3; 134/12; 134/26; 134/27; 134/28; 134/30; 134/34; 134/35; 134/36; 134/41; 134/42; 210/681; 210/685

(58) Field of Classification Search .......... 134/2, 3, 134/10, 12, 26, 27, 28, 30, 34, 35, 36, 41, 134/42; 210/681, 685
See application file for complete search history.

(56) References Cited

U.S. PATENT DOCUMENTS
2,772,237 A    11/1956   Bauman et al.
(Continued)

FOREIGN PATENT DOCUMENTS
DE    19609119    9/1997
(Continued)

OTHER PUBLICATIONS

International Search Report and Written Opinion from related PCT application PCT/US2009/003884, dated Oct. 20, 2009, 18 pages.

*Primary Examiner* — Bibi Carrillo
(74) *Attorney, Agent, or Firm* — Brocks, Cameron & Huebsch PLLC (57) ABSTRACT

Embodiments of the present disclosure include cleaning processes, cleaning machines, and methods of preventing acidification of a cleaning composition in a cleaning process. The cleaning process includes contacting an article having contaminants with a cleaning composition to remove the contaminants from the article, where the cleaning composition comes to have acidic components as a result of contacting the article with the cleaning composition, and where at least 85 percent by weight, based on a total weight of the cleaning composition, of the cleaning composition is an organic solvent, collecting the cleaning composition with the contaminants and the acidic components, separating the contaminants from the cleaning composition (114), and passing the cleaning composition with the acidic components over an ion exchange resin (125) to remove the acidic components from the cleaning composition.

11 Claims, 2 Drawing Sheets

U.S. PATENT DOCUMENTS

| | | | |
|---|---|---|---|
| 3,022,259 A | 2/1962 | Pearce | |
| 4,182,676 A * | 1/1980 | Casolo | 210/669 |
| 4,302,343 A | 11/1981 | Carswell et al. | |
| 4,341,567 A | 7/1982 | Roehl | |
| 4,345,609 A | 8/1982 | Nishizawa | |
| 5,071,527 A | 12/1991 | Kauffman | |
| 5,397,397 A | 3/1995 | Awad | |
| 5,500,127 A * | 3/1996 | Carey et al. | 210/685 |
| 5,604,441 A | 2/1997 | Freese et al. | |
| 5,661,117 A | 8/1997 | Dufresne | |
| 5,690,751 A | 11/1997 | Hösel et al. | |
| 5,782,989 A | 7/1998 | Rueter | |
| 5,968,848 A | 10/1999 | Tanabe et al. | |
| 6,184,423 B1 | 2/2001 | Jen | |
| 6,217,771 B1 * | 4/2001 | Boyle et al. | 210/638 |
| 7,258,795 B1 | 8/2007 | Nemeth et al. | |
| 7,674,340 B2 | 3/2010 | Tribelhorn et al. | |
| 2003/0024883 A1 | 2/2003 | Mullee | |
| 2004/0089153 A1 | 5/2004 | Burns et al. | |
| 2011/0030736 A1 * | 2/2011 | Geissler et al. | 134/30 |

FOREIGN PATENT DOCUMENTS

| | | |
|---|---|---|
| EP | 0156597 | 10/1985 |
| WO | 9827461 | 6/1998 |
| WO | 2004094831 | 11/2004 |

* cited by examiner

ACID REMOVAL IN CLEANING PROCESSES

This application is a National Stage application under 35 U.S.C. 371 of PCT/US2009/003884, filed on Jun. 30, 2009 and published as WO 2010/005518 on Jan. 14, 2010, which claims priority in part from U.S. Provisional Application Ser. No. 61/134,246 filed Jul. 8, 2008, the entire content of which is incorporated herein by reference.

FIELD OF DISCLOSURE

Embodiments of the present disclosure include removal of acidic components in cleaning processes; more specifically, embodiments of the present disclosure include removal of acidic components from a cleaning composition for use in cleaning processes.

BACKGROUND

Examples of cleaning and degreasing methods that have been applied to metals, ceramics, plastics, and other materials in the past can include alkali cleaning, cleaning with a surface active agent, cleaning with chloro-solvent, and/or cleaning with a fluoro-solvent. Alkali cleaning is cleaning achieved by dipping the material into a warm aqueous solution or alcohol solution of sodium hydroxide or other alkali agent, or by spraying such a solution. Cleaning with a surface active agent is achieved by dipping the material into a warm aqueous solution of a surface active agent, or by spraying such a solution. Cleaning with chloro-solvent involves dipping or vapor cleaning by using a chloro-solvent, such as, for example, 1,1,1-trichloroethane, trichloroethylene, and perchloroethylene. Finally, cleaning with a fluoro-solvent involves dipping or vapor cleaning, such as, for example, by using Freon 113.

Currently, organic solvents used in cleaning processes for various materials include hydrocarbons, halogenated hydrocarbons, propylene and ethylene glycol ethers, esters, or mixtures thereof. These solvents are useful since they can be recycled within the process by distillation. However, during the cleaning process, since closed-loop cleaning machines internally recycle the organic solvents by distillation, volatile acids which are brought in and/or generated in the cleaning process are often not removed from the cleaning fluid and therefore can enrich over time. These acids can be harmful to the machine and/or the cleaned parts.

SUMMARY

Embodiments of the present disclosure include cleaning processes, cleaning machines, and methods of preventing acidification of a cleaning composition in a cleaning process. As discussed herein, embodiments of the cleaning process include contacting an article having contaminants with a cleaning composition to remove the contaminants from the article, where the cleaning composition comes to have acidic components as a result of contacting the article with the cleaning composition, and where at least 85 percent by weight, based on a total weight of cleaning composition, of the cleaning composition is an organic solvent. The cleaning process also includes collecting the cleaning composition with the contaminants and the acidic components. The process also includes separating the contaminants from the cleaning composition, and passing the cleaning composition with the acidic components over an ion exchange resin to remove the acidic components from the cleaning composition.

In some embodiments, the ion exchange resin can be a strong anion exchange resin, for example, the ion exchange resin can be in OH⁻ form, or can be a styrene-divinylbenzene (styrene-DVB) copolymer resin.

In some embodiments, passing the cleaning composition with the acidic components over the ion exchange resin to remove the acidic components from the cleaning composition occurs continuously. As used herein, a "continuous" process step refers to a process where the ion exchange resin is positioned such that substantially all the cleaning composition that is separated from the contaminants continuously passes through the ion exchange resin.

In some embodiments, passing the cleaning composition and acidic components over the ion exchange resin to remove the acidic components from the cleaning composition occurs semi-continuously. As used herein, a "semi-continuous" process refers to the cleaning process including process streams connected to a feed reservoir, which acts as a buffer for process streams that are produced continuously or batch-wise with a frequency different than the distillation process.

As used herein, "a," "an," "the," "at least one," and "one or more" are used interchangeably. The terms "comprises" and variations thereof do not have a limiting meaning where these terms appear in the description and claims. Thus, for example, a cleaning process that comprises contacting "an" article with a cleaning composition can be interpreted to mean that the cleaning process includes contacting "one or more" articles with the cleaning composition.

The term "and/or" means one, more than one or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present disclosure is not intended to describe each disclosed embodiment or every implementation of the present disclosure. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION

Embodiments of the present disclosure include cleaning processes, cleaning machines, and methods of preventing acidification of a cleaning composition in a cleaning process. For the sake of convenience, the following description relates to the cleaning of an "article" although the process of the present disclosure is not limited to the cleaning of one article but is equally useful for cleaning several articles. In addition, the cleaning process steps, as described herein, can be performed in any order. Any such order given to the cleaning process steps are for description purposes only and are not intended to be limiting.

The cleaning process includes contacting an article having contaminants with a cleaning composition to remove the contaminants from the article, where the cleaning composition comes to have acidic components as a result of contacting the article with the cleaning composition, and where at least 85 percent by weight, based on a total weight of the cleaning composition, of the cleaning composition is an organic solvent. The cleaning process also includes collecting the cleaning composition with the contaminants and acidic components, separating the contaminants from the cleaning composition, and passing the cleaning composition with the acidic components over an ion exchange resin to remove the acidic components from the cleaning composition.

As used herein, "contaminants" in the cleaning composition result from soils on the surface of the article to be cleaned that are dissolved by the cleaning composition. When the article is cleaned in embodiments of the present disclosure, the soils on the surface of the article are removed by the cleaning composition. As a result, the cleaning composition includes the contaminants after contacting the surface of the article.

In addition, the cleaning composition comes to have acidic components as a result of contacting the article with the cleaning composition. The acidic components can be produced during the cleaning process, for example, from side reactions between contaminants before contaminant removal. In some instances, the contaminants that are dissolved from the article surface can include acidic components as a result of contacting the article with the cleaning composition. In such embodiments, as discussed further herein, when the contaminants are separated from the cleaning composition, the use of the word "contaminants" refers to soils that are dissolved from the article surface that are not acidic, and the use of the term "acidic components" refers to components from the soils that are acidic as well as acidic components in the cleaning composition from other sources.

In the Figure herein, as will be appreciated, elements shown in the embodiment herein can be added, exchanged, and/or eliminated so as to provide any number of additional embodiments of processes and/or systems. In addition, as will be appreciated the proportion and the relative scale of the elements provided in the figure is intended to illustrate the embodiments of the present invention, and should not be taken in a limiting sense. The drawing is a schematic illustration of an embodiment of the apparatus of the present disclosure.

Figure 1:
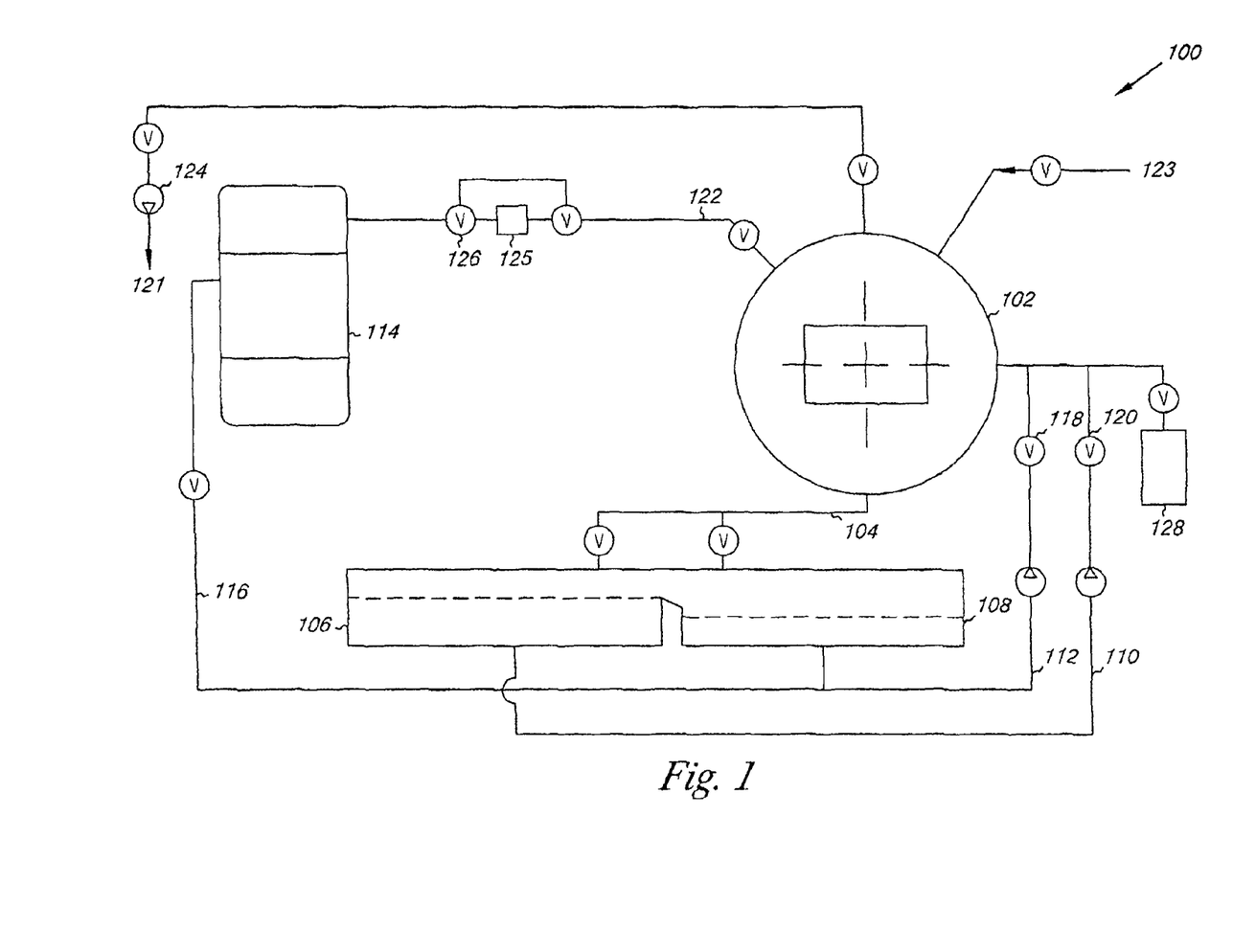
FIG. 1 illustrates an embodiment of a cleaning machine to perform a cleaning process according to embodiments of the present disclosure.

FIG. 1 illustrates a cleaning machine 100 to perform a cleaning process, where an article can be cleaned according to embodiments of the present disclosure. As shown, an article to be cleaned can be loaded into the cleaning chamber 102. The article can be loaded in a known manner, for example, the article can be placed into a container (e.g., a basket) if appropriate. Articles that can be provided to the cleaning chamber 102 include articles formed of metal, ceramic, glass, plastic, and/or other materials.

The cleaning chamber 102 can be an open chamber or a closed chamber. In embodiments where the article to be cleaned includes volatile contaminants and/or soils on the article surface, and/or in embodiments where the cleaning composition used in the cleaning process includes hazardous substances, a closed cleaning chamber 102 can be used to reduce the likelihood of hazardous substances being released into the atmosphere.

As will be appreciated by one skilled in the art, embodiments including a closed cleaning chamber 102 can employ the use of vacuum pumps for achieving a desired pressure reduction inside the closed cleaning chamber 102.

Inside the cleaning chamber 102, a surface of the article having contaminants can be contacted with a cleaning composition to clean the surface of the article. There are several different methods in which the surface of the article can be contacted with the cleaning composition. For example, in some embodiments, the cleaning chamber 102 can be flooded with cleaning composition in order to immersion wash the surface of the article. In addition, embodiments of the present disclosure also include spraying the cleaning composition in a liquid phase onto the surface of the article in order to clean the surface of the article. Spraying subjects the surface of the article to a solvent-flushing action as it flows downward. The liquid drops can be collected, and the process can be continued until the article has a clean surface.

Embodiments of the present disclosure also include vaporizing the cleaning composition and providing the cleaning composition vapor to the cleaning chamber 102. In such embodiments, the surface of the article can have a lower temperature than the vapor, allowing the vapor to condense on the article and subject its surface to a cleaning composition flushing action as it flows downward. The condensed cleaning composition can then be re-vaporized and provided back to the cleaning chamber. Thus, the surface of the article is continually rinsed with condensed vapor until the surface of the article has the same temperature of the vapor and condensation ceases. The continuous rinsing with the condensed vapor can also be stopped before the article has the same temperature of the vapor. Very effective cleaning of the surface of the article can be achieved.

In some embodiments, immersion washing, liquid spraying, and vapor degreasing can be performed sequentially on each article provided in the cleaning chamber 102. Embodiments also include performing one method of contacting the article with the cleaning composition, as well as different combinations of each method. For example, in some embodiments, the cleaning process can include spraying the article with the cleaning composition followed by a vapor degreasing step, as described herein. The vapor degreasing step can be a beneficial second step in the cleaning process since the vapors remain substantially free of the contaminants, or soils, after being revaporized. Also, the use of elevated temperatures in the vapor degreasing step can accelerate the rate of soil dissolution into the cleaning composition.

In some embodiments, the method of contacting the article with the cleaning composition, and/or the order of the methods of contacting the article, can depend on the type of material forming the article and/or the type of soils on the surface of the article.

As discussed herein, cleaning compositions used in cleaning processes of the present disclosure include organic solvents. The term "organic solvent," as used herein, encompasses undiluted organic compounds as well as mixtures of two or more organic compounds which are generally designated in the art as organic solvents, and also mixtures of one or more such organic compounds with water. The organic solvents in the cleaning composition can include hydrocarbons, halogenated hydrocarbons, alcohols, glycol ethers, esters, propylene glycol ethers, dipropylene glycol ethers, ethylene glycol ethers, ethylene glycol ether acetates, propylene glycol ether acetates, or mixtures thereof, among others.

Also, if the cleaning composition contains water, it preferably contains less than 15 percent, more preferably less than 10 percent, and most preferably contains less than 5 percent water, based on the total weight of the cleaning composition.

In some embodiments, the cleaning composition can also include additional elements, including, but not limited to, organic or inorganic acids, organic or inorganic bases (e.g., for pH control), antioxidants, corrosion inhibitors, metal passivators, and/or staining inhibitors, among others.

In addition, the cleaning composition can have a boiling point in a range of about 40 degrees Celsius to about 240 degrees Celsius. Preferably, the cleaning composition can have a boiling point in a range of about 90 degrees Celsius to about 200 degrees Celsius. By having a boiling point in such ranges, the cleaning composition can be separated from the contaminants in a distillation apparatus, as appreciated by one skilled in the art.

Also, as discussed herein, the cleaning composition comes to have acidic components as a result of contacting the article with the cleaning composition. The acidic components in the cleaning composition can result from the cleaning process, for example, the contaminants on the article that are removed can include acidic components. In addition, the acidic components can result from side reactions occurring throughout the cleaning process. Other ways of forming acidic components are also possible.

As discussed herein, the method of cleaning the article includes collecting the cleaning composition with the contaminants and the acidic components, and separating the contaminants from the cleaning composition. As shown in FIG. 1, the cleaning machine 100 includes a conduit system equipped with valves connecting the cleaning chamber 102 to other equipment in the cleaning machine 100. In addition, as shown, inlet air 123 can be fed into the cleaning chamber 102, while waste gas 121 can be removed from the cleaning machine 100 by means of a vacuum pump 124.

The cleaning composition with the contaminants and acidic components can be collected by including a process stream 104 connected to the cleaning chamber 102. The cleaning composition with the contaminants and acidic components can be transferred through the process stream 104 to one or more storage tanks 106, 108. The storage tanks 106, 108 can be connected to the cleaning chamber 102 in a known way. The cleaning process shown in FIG. 1 includes two storage tanks 106, 108, however, cleaning processes can include one storage tank, as well as more than two storage tanks.

The cleaning composition with the contaminants and the acidic components can then be transferred from the storage tanks 106, 108 back to the cleaning chamber via process streams 110 and 112, or the cleaning composition with the contaminants and the acidic components can be transported to a distillation apparatus 114 via process stream 116. In some embodiments, the cleaning composition with the contaminants and the acidic components can be transported to the distillation apparatus 114 continuously. In other words, the process stream 116 is constantly feeding the distillation apparatus 114 with cleaning composition from the storage tanks 106, 108.

In addition, in various embodiments, the cleaning composition with the contaminants and the acidic components can be transported to the distillation apparatus semi-continuously. In such embodiments, process streams 110, 112 and also process stream 116 can be opened and closed periodically using valves to transfer the cleaning composition with the contaminants and the acidic components directly back to the cleaning chamber 102 and to the distillation apparatus 114 depending on which process streams are opened. In such embodiments, the periodicity of when the cleaning composition with the contaminants and the acidic components is transferred to the distillation apparatus 114 can be based on a number of different factors. For example, the periodicity can be based on the type and amount of soils on the surface of the article, the method of contacting the article with the cleaning composition (e.g., fluid spraying), the type of article, and/or the level of cleanliness required for the article, among others.

As used herein, "distilling" refers to a process of separating compounds based on their differences in volatilities by vaporization and subsequent condensation, as for purification or concentration. In embodiments discussed herein, distillation can be performed on the cleaning composition to purify the cleaning composition. In addition, as used herein, a "distillation apparatus" refers to a device that carries out the distillation process.

The distillation apparatus 114 of the present disclosure can include enough equilibrium stages to remove the contaminants from the cleaning composition. As used herein, an "equilibrium stage" can refer to a hypothetical zone or stage in which two phases, such as the liquid and vapor phases of a substance, establish equilibrium with each other. The equilibrium stage can also be referred to as a theoretical tray.

The distillation apparatus 114 of the present disclosure can have trays, dumped packing, or structured packing. In embodiments where the distillation apparatus 114 has trays, the trays can be physical devices which are used to provide contact between an upflowing vapor and a downflowing liquid inside the distillation apparatus 114.

In some embodiments, the distillation apparatus 114 can use packing rather than trays. In some embodiments, packing can offer the advantage of a lower pressure drop across the distillation apparatus 114 (when compared to trays). In embodiments using packing, the packing material can be random dumped packing such as, for example, Raschig rings, Pall rings, or Bialecki rings in metal or ceramic. The packing material can also be structured sheet-metal packing such as those known and commercially available for example under the designations Gempak® (Glitsch, Inc. Dallas, Tex., U.S.A), Mellapak® (Gebr. Sulzer, Winterthur, Switzerland), or Relapak®.

In some embodiments the distillation apparatus 114 is operated under vacuum. As the boiling point of a solvent is lowered at lowered pressure, the temperature in the distillation bottom can be lowered under vacuum. This can be used to minimize the formation of unwanted products by thermal decomposition reactions. Furthermore, the cleaning composition content of the waste stream from the distillation bottom can be minimized which leads to lower cleaning composition consumption.

Distilling the cleaning composition with the contaminants and the acidic components in the distillation apparatus 114 can remove the contaminants from the cleaning composition. However, the separation process is unable to remove the acidic components from the cleaning composition. For example, in some embodiments, the cleaning composition includes volatile acidic components even after it exits the distillation apparatus 114. In addition, as appreciated by one skilled in the art, separating the cleaning composition from the contaminants can include further separation within the cleaning process. For example, the cleaning process can include passing the distillate (i.e., the cleaning composition) from the distillation apparatus 114 to a water decanter and/or a condenser.

In prior art processes, the cleaning composition with the acidic components exit the distillation apparatus 114 and are transported back to the cleaning chamber 102 for additional cleaning of the article, or to restart the cleaning process for a new article, using the continuous process as has been described thus far. However, in such processes, the acidic components in the cleaning composition can build to a level that can be harmful to the closed loop cleaning machine 100 and/or the article to be cleaned.

As such, a method of preventing the build up of acidic components in the cleaning composition has been sought.

Such methods have included, for example, draining the cleaning composition with the acidic components from the cleaning machine 100 and replacing with new cleaning composition when the acidic components in the cleaning composition reaches a certain level. As will be appreciated by one skilled in the art, this process is time consuming and costly both due to the loss in efficiency from shutting the cleaning machine 100 down but also due to the loss of organic solvents in the cleaning composition.

Another method of preventing the build up of acidic components in the cleaning composition includes adding additives to the cleaning composition in order to react with the acidic components, thereby neutralizing the acidic components. For example, in some embodiments amine-based additives have been added to the cleaning composition. However, although the amine-based additives can neutralize some of the acidic components, it has been found that not all of the acidic components are neutralized. In this case, although the amine-based additives can slow the buildup of acidic components in the cleaning composition, the build up continues until the cleaning composition with the acidic components is harmful, and thus, in need of replacement.

Since there exists the problem of acidic component build up in the cleaning composition, and the methods in the prior art are unsuccessful and/or too costly and inefficient to be satisfactory, a method of removing the acidic components from the cleaning composition in a cleaning machine 100 is sought.

The inventors of the present disclosure considered the problem of acidic component build up in the cleaning composition and the methods in the prior art. To determine why the amine-based additives did not neutralize substantially all the acidic components in the cleaning composition, analysis of process streams by ion chromatography and distillation lab trials with amines and acids were performed. From the analysis, it was determined that amine salts of some acids are not stable under the conditions of the distillation unit, thus, the amine-based additive does not react with all the acidic components to form an amine salt that can then be separated from the cleaning composition in the distillation unit.

Once it was determined why the amine-based additive did not work to neutralize the acidic components in the cleaning composition, several other additives were experimented with to remove the acidic components. First, over-based calcium sulfonates were added to the cleaning composition. However, the over-based calcium sulfonates formed a thick, gel-like substance in the cleaning composition. Second, sodium carbonate was added to the cleaning composition. However, the sodium carbonate does not react with the acidic components without the presence of water in the cleaning composition. Since the cleaning composition can be substantially water-free, the sodium carbonate would not work in all cleaning processes using the cleaning composition of the present disclosure. Last, sodium hydroxide was added to the cleaning composition. However, the sodium hydroxide, although it can react with substantially all the acidic components in the cleaning composition to neutralize the acidic components, it is a very strong base that can be harmful to the cleaning machine 100 and/or to the articles to be cleaned.

Since the addition of additives to the cleaning composition had problems associated with each, the inventors of the present disclosure looked to a method of removing the acidic components using spatial separation in the cleaning process. As such, embodiments of the present disclosure include passing the cleaning composition with the acidic components from the distillation apparatus 114 over an ion exchange resin 125 to remove the acidic components from the cleaning composition.

In some embodiments, the ion exchange resin 125 can be a strong anion exchange resin. In various embodiments, the ion exchange resin can be in OH⁻ form. Also, the ion exchange resin can be a styrene-divinylbenzene (styrene-DVB) copolymer resin.

In some embodiments, the ion exchange resin 125 can be positioned between the distillation apparatus 114 and the cleaning chamber 102. In various embodiments, the ion exchange resin 125 can be located in the distillate stream (e.g., process stream 122) down stream of the distillation apparatus 114. For example, the ion exchange resin 125 can be positioned between the distillation apparatus 114 and the cleaning chamber 102. In addition, as discussed herein, in some embodiments, the ion exchange resin 125 can be positioned after a water decanter, or a condenser. As such, the ion exchange resin 125 can be contained in a cartridge that is insertable into the cleaning machine 100 at the various possible positions. For example, process stream 122 can be set up so as to allow the ion exchange resin 125 to be inserted and/or exchanged. For example, valve 126 can be closed in order to replace the ion exchange resin 125 without disrupting the cleaning process. The cleaning composition can then pass over the ion exchange resin 125 to remove the acidic components from the cleaning composition before it is transferred back to the cleaning chamber 102 and/or the storage tanks 106, 108.

As discussed herein, in some embodiments, the cleaning composition with the contaminants and the acidic components can bypass the distillation apparatus 114, or can be transferred to the distillation apparatus 114 semi-continuously. Similarly, in some embodiments, the distillate (i.e., cleaning composition and acidic components) can pass over the ion exchange resin 125 continuously. In other words, valve 126 can be closed, forcing all the cleaning composition with the acidic components to flow to the ion exchange resin 125.

In addition, in various embodiments, the cleaning composition with the acidic components can be passed over the ion exchange resin 125 semi-continuously. In such embodiments, valve 126 can be opened and closed periodically to transfer the cleaning composition with the acidic components directly back to the cleaning chamber 102 and to the ion exchange resin 125 depending on whether valve 126 is opened. In such embodiments, the periodicity of when the cleaning composition with the acidic components is transferred to the ion exchange resin 125 can be based on a number of different factors. For example, the periodicity can be based on the amount of acidic components in the cleaning composition, the type and amount of soils on the surface of the article, the method of contacting the article with the cleaning composition (e.g., fluid spraying), the type of article, and/or the level of cleanliness required for the article, among others.

The cleaning composition can be recycled back to the cleaning chamber 102 via process stream 122. In addition, in some embodiments, additional cleaning composition can be transferred to the closed chamber 102 from a storage tank 128 containing unused, unrecycled cleaning composition.

As appreciated by one skilled in the art, the cleaning composition with the contaminants and the acidic components can be passed over the ion exchange resin 125 to remove the acidic components to be used to clean the article inside the cleaning chamber 102 continuously while the article is being cleaned. Since the cleaning composition is being recovered and recycled throughout the cleaning machine 100, the cleaning machine operates in a closed loop. In other words, in some embodiments, the cleaning process can continue without the addition of new, unused cleaning composition.

As appreciated by one skilled in the art, once the article is cleaned, the cleaned articles can be dried, and the cleaning chamber 102 can be unloaded.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

Embodiments of the present disclosure are illustrated by the following examples. It is to be understood that the particular examples, materials, amounts, and procedures are to be interpreted broadly in accordance with the scope and spirit of the invention as set forth herein.

EXAMPLES

The following examples are given to illustrate, but not limit, the scope of this disclosure. Unless otherwise indicated, all parts and percentages are by weight. Unless otherwise specified, all instruments and chemicals used are commercially available.

Materials

Sodium Hydroxide (NaOH): available from Sigma Aldrich, St. Louis, Mo. USA.

Charcoal NORIT® RO SX 1 available from Sigma Aldrich, St. Louis, Mo. USA.

Charcoal NORIT® RO 0.8 available from Sigma Aldrich, St. Louis, Mo. USA.

$Al_2O_3$ spheres (Fluka 06400) available from Sigma Aldrich, St. Louis, Mo. USA.

$Al_2O_3$ (basic) powder, (Fluka 17994) available from Sigma Aldrich, St. Louis, Mo. USA.

Calcinate™ OR overbased calcium sulfonates: available from Blaser Swisslube, Inc., Goshen, N.Y. USA.

Acetic acid (99-100 percent): available from Merck & Co., Whitehouse Station, N.J. USA.

Ion Exchange Resins:
DOWEX™ resins: available from The Dow Chemical Company, Midland, Mich. USA.
Lewatit® resins: available from LANXESS Deutschland GmbH, Leverkusen, Germany.
DOWCLENE™ 1601: available from The Dow Chemical Company, Midland, Mich. USA.
DOWCLENE™ 1611: available from The Dow Chemical Company, Midland, Mich. USA.

Example 1

In this example, the total exchange capacity of potential acid absorbing materials is determined. The absorber materials listed in Table 1 are flushed with DOWCLENE™ 1601 solvent to remove excess water prior to the experiment. Then, 10 to 20 grams of absorber materials and 250 milliliters (ml) of DOWCLENE™ 1601 are spiked with a defined amount of acetic acid (e.g., about 2,000 parts per million-weight (ppm-wt.)) and agitated at room temperature. Solvent samples are taken until a stable acetate level (steady state) is measured by ion chromatography. From the mass balance of acetic acid in the solvent before and after the experiment, the capacity of the absorber materials can be calculated. Table 1 gives the capacities of various absorber materials.

TABLE 1

| Absorber Material | Capacity (mg/g) |
|---|---|
| $Al_2O_3$ spheres (Fluka 06400) | 12 |
| $Al_2O_3$ (basic) powder, (Fluka 17994) | 38 |
| Charcoal NORIT ® RO SX 1 | 5 |
| Charcoal NORIT ® RO 0.8 | 15 |
| Resin Lewatit ® Monoplus MP800 | 53 |
| Resin DOWEX ™ MSA-1C(OH) | 85 |
| Resin DOWEX ™ SBR(OH) | 103 |

High capacities are found for a gel-type resin (DOWEX™ SBR) while the other ion exchange resins still have higher capacities than charcoal or aluminum oxide. Although basic aluminum oxide (Fluka 17994) has a total capacity clearly better than charcoal or the $Al_2O_3$ sphere, it has very slow exchange kinetics, as only 50 percent of its capacity is reached after 24 hours, while the ion exchange resins reach steady state after 2 to 4 hours.

Example 2

In Example 2, a continuous set up is used. In order to remove excess water, 22.6 g DOWEX™ SBR(OH) is treated 3 times for 30 minutes (min) each with 250 ml DOWCLENE™ 1601. The resin is then packed into a fixed bed (e.g., glass column) and continuously flushed in a loop with acetic acid-spiked DOWCLENE™ 1601 using a peristaltic pump. Measurement of acetate in the solvent is done by ion chromatography. When a concentration of less than 1 ppm-wt is reached, additional acetic acid is added to the solvent until breakthrough of the acid is detected.

The results in Table 2 illustrate that complete removal (e.g., less than 1 ppm-wt) of acetic acid can be achieved in a continuous step until breakthrough capacity is reached. Also, as can be seen from the analysis of samples 3 and 4, flushing the partially loaded bed with virtually acetate-free feed for more than 4 hours does not lead to desorption and breakthrough of acetate.

TABLE 2

| t (h:min) | Step | c acetate (ppm-wt) |
|---|---|---|
| 0 | concentration measurement at start of trial | 736 |
| 0:45 | Solvent sample 1 | 20 |
| 3:00 | Solvent sample 2 | <1 |
| 3:45 | spiked with 1124 ppm acetic acid | |
| 5:15 | Solvent sample 3 | <1 |
| 9:30 | solvent sample 4 and addition of 2460 ppm acetic acid | <1 |
| 12:45 | Solvent sample 5 | <1 |
| 15:00 | addition of 4128 ppm acetic acid | |
| 15:45 | Solvent sample 6 | 1601 |

Example 3

In this example, the total exchange capacity of a potential acid absorbing material is determined, as is described in Example 1. However, in this example, the resin DOWEX™ MSA-1C(OH) is flushed before the experiment with a molecular sieve-dried DOWCLENE™ 1601 until the water content of the flushing liquid is only 0.07 percent water. Furthermore, the DOWCLENE™ 1601 solvent used as a carrier for the acetic acid is dried with a molecular sieve before the experiment. In this example, the acetic acid capacity of the DOWEX™ MSA-1C(OH) resin is 85 milligrams per gram (mg/g). This is the same value as is determined in Example 1 for this particular resin. As such, the results indicate that water is not a necessary component to carry out the reaction to remove acid from the stream passing through the resin.

Example 4

In this example, the total exchange capacity of an acid absorbing material is determined over a period of time. As in Example 1, the resin is flushed with DOWCLENE™ 1601 solvent to remove excess water prior to the experiment. However, in this example, 10 to 20 g of absorber materials and 250 ml DOWCLENE™ 1601 are spiked with 4,906 ppm-wt acetic acid and left standing at room temperature, as opposed to agitating the absorber material and the DOWCLENE™. The acetate level of the solvent is measured regularly by ion chromatography. The graph, shown in FIG. 2, shows the acetic acid concentration as a function of time.

Figure 2:
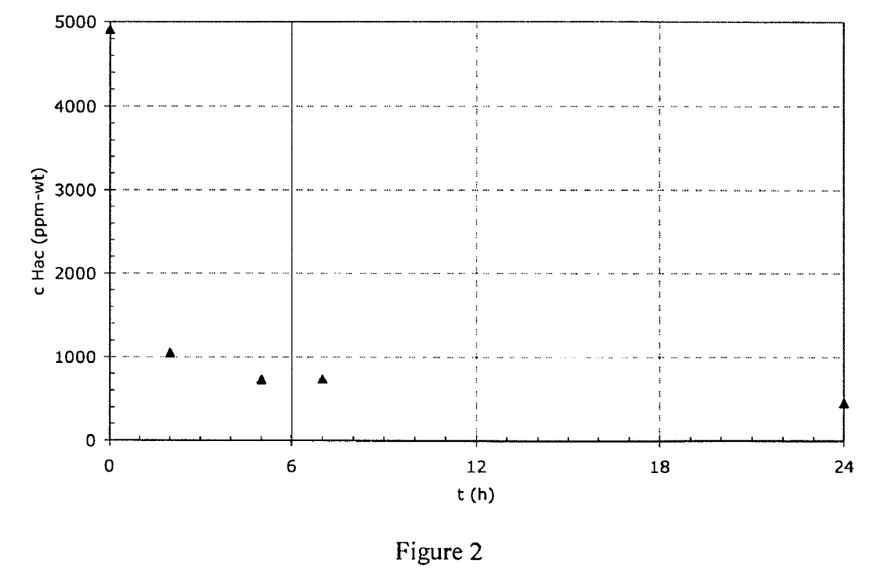
FIG. 2 illustrates an exchange capacity of an acid absorbing material of the present disclosure as a function of time.

As can be seen from FIG. 2, the reaction is almost in the steady state after 5 hours of reaction time, even without mixing the absorber material and the solvent. The acid levels in cleaning machines can change at a maximum of about 100 to about 500 ppm-wt within one week, therefore, from FIG. 2, the reaction of the absorber materials is fast enough to be commercially practical.

Example 5

In this Example, in order to determine the stability of the resin in the organic medium, 25 ml of resin is added to 25 ml of solvents and then kept for 48 hours at 80 degrees Celsius. After filtration, the solvent is evaporated over night at 80 degrees Celsius and the residue is weighed. Table 3 shows that only a very small amount of the resins is dissolved during the experiment.

TABLE 3

| | Resin type | | Solvent Type | | Solubility |
|---|---|---|---|---|---|
| No. | Lewatit ® Monoplus MP800 m (g) | DOWEX ™ SBR(OH) m (g) | DOWCLENE ™ 1601 m (g) | DOWCLENE ™ 1611 m (g) | Dissolved Resin (wt. percent) |
| 1 | 12.98 | | 21.55 | | 0.005 |
| 2 | | 26.33 | 22.19 | | 0.003 |
| 3 | 13.35 | | | 23.52 | 0.027 |
| 4 | | 25.41 | | 23.31 | 0.023 |

As can be seen from Table 3, very little resin dissolves in the solvent after 48 hours. As the resins are stable in the tested solvents, these resins can be used in cleaning machines where non-volatile residue content of the solvent is considered a critical quality factor.

Example 6

In this example, 150 ml (132 g) of DOWCLENE™ 1601, 4 ml (4.196 g) acetic acid, and 10.83 g Calcinate™ OR overbased calcium sulfonate are fractionally distilled at 100 millibar (mbar). Fractional distillation is the separation of a mixture into its component parts, or fractions, by heating them to a temperature at which several fractions of the compound will evaporate. The amount of overbased calcium sulfonate is calculated to be 110 percent of the equimolar amount needed to neutralize the acetic acid. A sample of the initial mixture is tested to be alkaline using pH indicator paper. The results of the distillation are shown in Table 4.

TABLE 4

| Distillate fraction | bottom temperature (° C.) | mass (g) | Volume (ml) | pH: | acetate (mg/l) |
|---|---|---|---|---|---|
| 1 | 102 | 11.45 | 13.01 | 2.81 | 12,287 |
| 2 | 103 | 37.98 | 43.16 | 3.01 | 4,353 |
| 3 | 109 | 35.44 | 40.27 | 3.1 | 2,095 |
| 4 | 135 | 17.39 | 19.76 | 3.38 | 853 |
| bottom | | 37.4 | 100 | n.d. | 36,227 |

* n.d. = not determined

As shown in Table 4, acetic acid is found in all the distillate fractions. As such, the overbased calcium sulfonate is shown to not be able to bind with acetic cid under the conditions of the distillation, which closely resembles the operation of a solvent redistillation unit in a cleaning machine.

Similar trials using $Na_2CO_3$ and triethanolamine in place of overbased calcium sulfonate are also shown to not be suited to capture acetic acid under the conditions of Example 6.

What is claimed is:

1. A cleaning process, comprising:
   providing an article formed of a material selected from the group consisting of metal, ceramic, glass or plastic, wherein the article has contaminants on its surface;
   in a cleaning chamber contacting the article with a cleaning composition having at least 85 percent by weight of an organic solvent based on a total weight of the cleaning composition;
   removing the contaminants from the article, where the cleaning composition acquires acidic components from the contaminants removed from the article or from side reactions occurring in the cleaning process;
   collecting the cleaning composition with the contaminants and the acidic components;
   separating the contaminants from the cleaning composition; and passing the cleaning composition with the acidic components over an ion exchange resin to remove the acidic components from the cleaning composition.

2. The process of claim 1, where the ion exchange resin is a styrene-divinylbenzene copolymer resin.

3. The process of claim 1, where passing the cleaning composition with the acidic components over the ion exchange resin to remove the acidic components from the cleaning composition occurs continuously.

4. The process of claim 1, where the organic solvent in the cleaning composition is selected from a group consisting of alcohols, propylene glycol ethers, ethylene glycol ethers, ethylene glycol ether acetates, propylene glycol ether acetates, esters, hydrocarbons, or mixtures thereof.

5. The process of claim 1, where passing the cleaning composition with the acidic components over the ion exchange resin to remove the acidic components from the cleaning composition occurs semi-continuously.

6. The process of claim 1, where the cleaning composition contains less than 15 percent water based on the total weight of the cleaning composition.

7. A method of removing acidic components from of a cleaning composition in a cleaning process, comprising:
provinding an article formed of a material selected from the group consisting of metal, ceramic, glass or plastic, the article having contaminants on a surface of the article, where the contaminants are to be removed;
in a cleaning chamber contacting the surface of the article with the cleaning composition having at least 85 percent by weight of an organic solvent based on a total weight of the cleaning composition to remove the contaminants from the surface of the article, where the cleaning composition acquires acidic components from the contaminants removed from the article or from side reactions occurring in the cleaning process;
collecting the cleaning composition with the contaminants and the acidic components;
separating the contaminants from the cleaning composition; and
passing the cleaning composition with the acidic components over an ion exchange resin to remove the acidic components from the cleaning composition.

8. The method of claim 7, where the ion exchange resin is an anion exchange resin.

9. The method of claim 7, where the ion exchange resin is in OH⁻ form.

10. The method of claim 7, where the cleaning composition has a boiling point in a range of about 40 degrees Celsius to about 240 degrees Celsius.

11. The method of claim 10, where the cleaning composition has a boiling point in a range of about 90 degrees Celsius to about 200 degrees Celsius.

* * * * *

UNITED STATES PATENT AND TRADEMARK OFFICE
CERTIFICATE OF CORRECTION

| | | |
|---|---|---|
| PATENT NO. | : 8,029,623 B2 | Page 1 of 1 |
| APPLICATION NO. | : 12/737381 | |
| DATED | : October 4, 2011 | |
| INVENTOR(S) | : Konrad Geissler and Marius Kuemin | |

It is certified that error appears in the above-identified patent and that said Letters Patent is hereby corrected as shown below:

On the Title Page, Item (74), Attorney, Agent, or Firm, line 1, delete "Brocks", insert --Brooks--

Signed and Sealed this
Twenty-second Day of November, 2011

David J. Kappos
*Director of the United States Patent and Trademark Office*